(12) United States Patent
Drape et al.

(10) Patent No.: US 8,120,878 B1
(45) Date of Patent: Feb. 21, 2012

(54) TUBULAR STIFFENING RAILS FOR HEAD SUSPENSION COMPONENTS

(75) Inventors: Rick R. Drape, Hutchinson, MN (US); Corey S. Hartmann, Litchfield, MN (US); Duane A. Lundin, Litchfield, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 649 days.

(21) Appl. No.: 12/253,348

(22) Filed: Oct. 17, 2008

(51) Int. Cl.
*G11B 5/48* (2006.01)
(52) U.S. Cl. ............... 360/244.9; 360/244.8; 360/244.3
(58) Field of Classification Search ............... 360/244.9, 360/244.8, 244.3
See application file for complete search history.

(56) References Cited

U.S. PATENT DOCUMENTS

| | | | |
|---|---|---|---|
| 1,649,586 A | 11/1927 | Habart | |
| 4,204,235 A | 5/1980 | Stollorz | |
| 5,198,945 A | 3/1993 | Blaeser et al. | |
| 5,877,923 A * | 3/1999 | Khan et al. | 360/244.9 |
| 6,313,970 B1 | 11/2001 | Pace et al. | |
| 6,751,065 B2 | 6/2004 | Smith et al. | |
| 6,751,066 B1 | 6/2004 | Warmka et al. | |
| 7,430,096 B1 * | 9/2008 | Bjorstrom et al. | 360/244.9 |
| 7,551,400 B2 * | 6/2009 | Renken et al. | 360/244.9 |
| 2005/0243471 A1 | 11/2005 | Hiraki | |

FOREIGN PATENT DOCUMENTS

JP 4-291066 10/1992

OTHER PUBLICATIONS

Kalpakjian, Serape., Illinois Institute of Technology, "Manufacturing Processes for Engineering Materials", 3 pages, 1997.
Wick, Charles et al., Tool and Manufacturing Engineers handbook, 4th Edition 1984, vol. II Forming, Chapter 4, cover page and p. 4-9.
Palick, Ron, "Focus on Tooling", http://www.finnpowercom/finnishline/Volume13_Issue02/focus_on_tooling_wilson.html, © Copyright 2003, 2 pages.
Curling Operation—Wikipedia, the free encyclopedia, dated Jul. 21, 2008, 1 page.

* cited by examiner

*Primary Examiner* — David Lam
(74) *Attorney, Agent, or Firm* — Faegre Baker Daniels LLP (57) ABSTRACT

A relatively stiff head suspension component. The suspension component is comprised of a sheet material having a major surface with side-edges. Tubular stiffening rails are integrally formed on the side-edges from the sheet material. The tubular rails have a substantially symmetrical cross section and extend around at least about 270 degrees from the major surface.

10 Claims, 8 Drawing Sheets

TUBULAR STIFFENING RAILS FOR HEAD SUSPENSION COMPONENTS

FIELD OF THE INVENTION

The invention relates generally to components for head suspensions used in disk drives. In particular, the invention is a tubular rail structure for a head suspension component.

BACKGROUND OF THE INVENTION

Head suspensions for supporting a head over a rotating disk in hard disk drives are well known. Such head suspensions typically comprise a load beam having a flexure or gimbal at its distal end. A head slider having a read/write transducer is mounted to the flexure. In operation, the rotating disk creates an air bearing on which the head slider floats. The head suspension provides a spring force counteracting the force generated by the air bearing to position the slider at a specified "fly height". The flexure is sufficiently compliant to allow the slider to pitch and roll in response to fluctuations in the air bearing created by variations in the surface of the rotating disk. In this manner, the head slider is supported and can be positioned over the disk by an actuator assembly driven by a voice coil motor to read or write information on the data tracks of the disk.

As the trend to pack more data onto every square inch of the disk surface continues, the head suspension needs to track more precisely and the slider needs to fly closer to the disk surface. In order to track more precisely, the resonant characteristics of the suspension must improve; i.e. a stiffer suspension is required. Counteracting the need for a stiffer suspension is the need for lower spring forces and thus thinner suspension components to accommodate lower fly heights.

Stiffening rails, to transfer the spring force of the suspension to the slider and to increase the resonance frequencies of the suspension, are also well known. Conventional stiffening rails, such as disclosed in U.S. Pat. Nos. 5,198,945 to Blaeser et al.; and 6,313,970 to Pace et al., do not provide adequate resonance characteristics for thin suspension components.

There is a continuing need for improved stiffening rails in head suspensions. Specifically, there is a need for a rail structure that increases resonance frequency modes in thin suspension components. To be commercially viable, such rails should be capable of being efficiently and accurately manufactured.

SUMMARY OF THE INVENTION

The present invention is a relatively stiff head suspension component. The suspension component is comprised of a sheet material having a major surface with side-edges. Tubular stiffening rails are integrally formed on the side-edges from the sheet material. The tubular rails have a substantially symmetrical cross section and extend around at least about 270 degrees from the major surface.

DETAILED DESCRIPTION OF THE INVENTION

Figure 1:
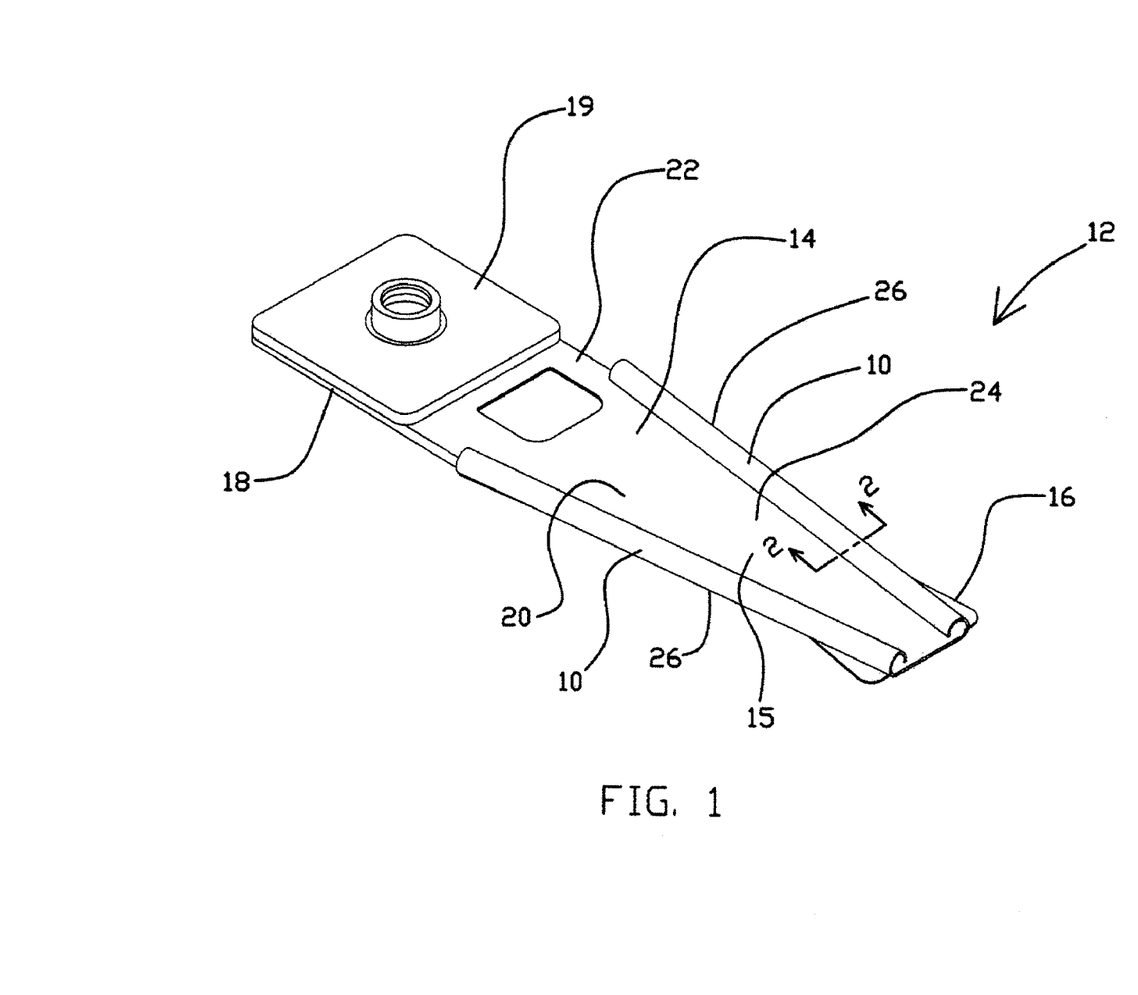
FIG. 1 is an isometric view of head suspension assembly having tubular rails in accordance with one embodiment of the invention.

FIG. 1 is an illustration of a head suspension assembly 12 including tubular rails 10 in accordance with one embodiment of the present invention. As shown, suspension 12 includes load beam 14 with flexure 16 welded or otherwise attached to the load beam. Load beam 14 includes a mounting region 18 at its proximal end, a relatively rigid beam region 20 and a spring region 22 between the mounting and beam regions. Load beam 14 is made of a spring metal sheet material 15 and further includes a major surface 24 having side-edges 26. Tubular rails 10 are integrally formed on the side-edges 26 from sheet material 15 and can extend along essentially the entire length of beam region 20, as shown, or extend partially along one or more portions of beam region 20. A base plate 19 is welded or otherwise attached to the mounting region 18. The flexure 16 is configured to have a slider (not shown) adhesively bonded or otherwise mounted on the slider mounting region, shown more clearly as 817 in FIG. 10.

Figure 2:
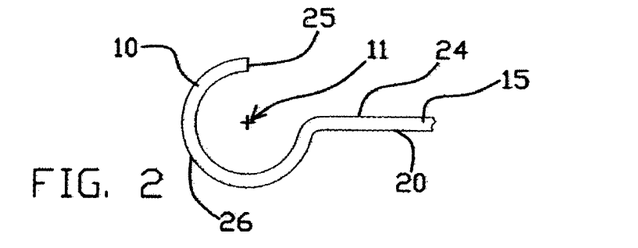
FIG. 2 is a detailed cross sectional view, taken along line 2-2, of the tubular rail shown in FIG. 1.

FIG. 2 is a cross sectional view of tubular rail 10 taken along line 2-2 in FIG. 1. As shown, tubular rail 10 has a substantially symmetrical, circular cross section extending around about 270 degrees from major surface 24 and includes free edge 25. In other embodiments, tubular rail 10 extends around from about 270 degrees to about 360 degrees from major surface 24. While a circular cross section is shown in FIG. 2, other substantially symmetrical, cross sectional shapes such as rectangular, polygonal, oval or elliptical are within the scope of the invention. In the embodiment shown, the cross section of tubular rail 10 has a central axis 11 essentially within the plane of major surface 24 of beam region 20 though, in other embodiments, central axis, or portions thereof, may be within a plane that is generally offset from major surface 24. For example, the central axis 11 of the tubular rail 10 may transition along its length from being essentially within the plane of major surface 24 at one end to being offset from the major surface 24 at the other end. In another example, central axis 11 of tubular rail 10 may be offset by essentially the same amount from major surface 24 along the entire length of rail 10.

Figure 3:
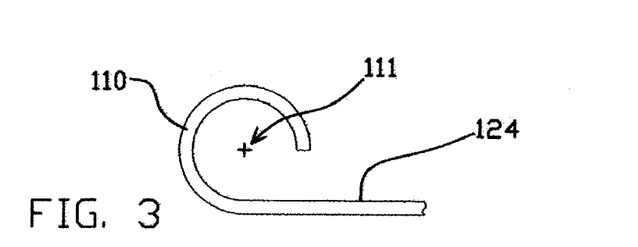
FIG. 3 is a detailed cross sectional view of a tubular rail in accordance with another embodiment of the invention.

FIG. 3 is a cross sectional view of another embodiment of tubular rail 110. The cross section of FIG. 3 is generally perpendicular to the longitudinal axis of rail 110. As shown, central axis 111 of rail 110 is offset from major surface 124. Rail 110 is similar in size and shape to rail 10 but can have other sizes, dimensions, geometries and degrees of extension from major surface 124 as well.

Figure 4:
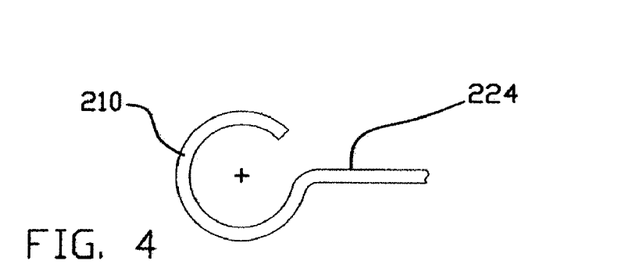
FIG. 4 is a detailed cross sectional view of a tubular rail in accordance with still another embodiment of the invention.

FIG. 4 is a cross section, taken generally perpendicular to the longitudinal axis, of tubular rail 210 according to another embodiment of the invention. Rail 210 can have other sizes and geometries but is shown similar in size and shape to rail 10 and extending around about 345 degrees from major surface 224. Although rail 210 is shown extending around about 345 degrees, rails extending around from about 270 degrees to about 360 degrees are also contemplated.

Figure 5:
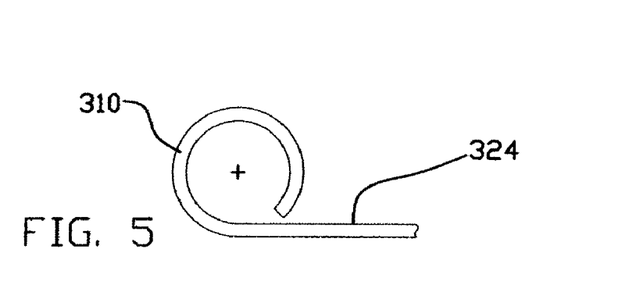
FIG. 5 is a detailed cross sectional view of a tubular rail in accordance with yet another embodiment of the invention.

A cross sectional view, generally perpendicular to the longitudinal axis, of tubular rail 310 according to another embodiment of the invention is shown in FIG. 5. Rail 310 is similar to rail 110 and extends around about 345 degrees from major surface 324. Although rail 310 is shown extending around about 345 degrees, rails extending around from about 270 degree to about 360 degrees as well as rails of different sizes and geometries are within the scope of the invention.

Figure 6:
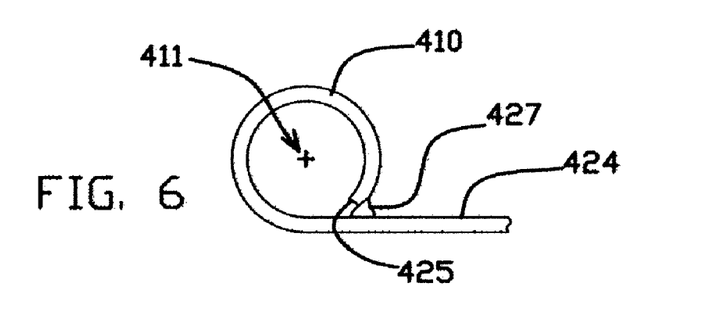
FIG. 6 is a detailed cross sectional view of a tubular rail fixedly attached to a major surface of the head suspension component.

FIG. 6 shows a cross sectional view, generally perpendicular to the longitudinal axis, of another embodiment of tubular rail 410. Rail 410 extends around about 360 degrees such that free edge 425 of rail 410 is attached to major surface 424 via weld 427 or other methods such as adhesive bonding. Free edge 425 can be attached to major surface 424 along the entire length or at one or more specific locations along the length of rail 410. Though rail 410 is shown similar in size and shape to rail 310 other sizes and geometries are contemplated. For example, rails with rectangular, polygonal, oval or elliptical cross sections and coplanar or offset central axes 411 can have free edges 425 extending around about 360 degrees and attached to major surface 424.

Figure 7:
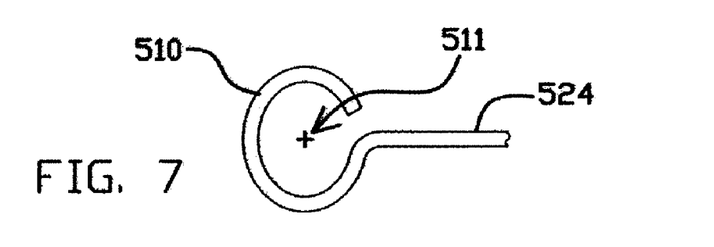
FIG. 7 is a detailed cross sectional view of a tubular rail in accordance with another embodiment of the invention.

Shown in FIG. 7 is a cross section, taken generally perpendicular to longitudinal axis, of tubular rail 510 in accordance with another embodiment of the invention. Rail 510, as shown, has a substantially symmetrical, oval cross section extending around about 330 degrees from major surface 524 though cross sections extending around from about 270 degrees to about 360 degrees are contemplated. As shown, central axis 511 of rail 510 is essentially within the plane of major surface 524 although embodiments having central axis 511 within a plane generally offset from major surface 524 are within the scope of the invention. Rail 510 is shown as having a generally vertically oriented oval cross section though other embodiments can have generally horizontally or obliquely oriented oval or elliptical cross sections.

Figure 8:
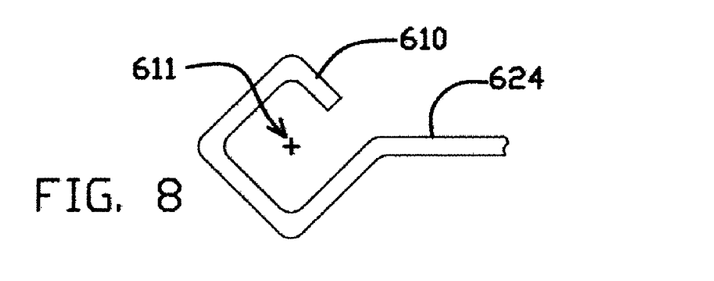
FIG. 8 is a detail cross sectional view of a tubular rail in accordance with another embodiment of the invention.

One embodiment of a substantially symmetrical, polygonal shaped tubular rail 610 is shown in cross section in FIG. 8. The cross section of FIG. 8 is taken generally perpendicular to the longitudinal axis of rail 610 and, as shown, extends around about 345 degrees from major surface 624. Other embodiments may extend from about 270 degrees to about 360 degrees from the major surface 624. Central axis 611 of rail 610 is shown to be generally within the plane of major surface 524 though embodiments having central axis within a plane generally offset from major surface 524 are also contemplated. Though the polygonal cross section of tubular rail 610 is shown as being generally square, substantially symmetrical polygonal rail shapes of other sizes, dimensions and geometries such as diamond, trapezoidal and rectangular are within the scope of the invention.

Figure 9:
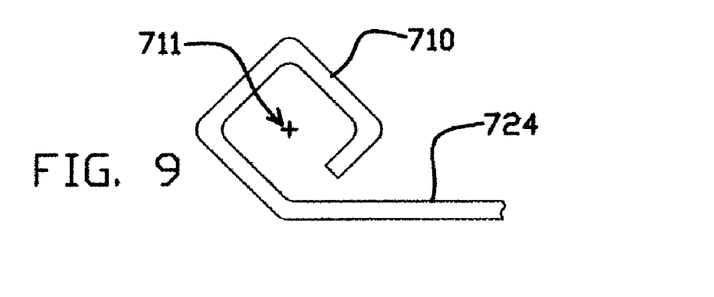
FIG. 9 is a detailed cross sectional view of a tubular rail in accordance with another embodiment of the invention.

A cross section of another embodiment of a generally rectangular shaped tubular rail 710 is shown in FIG. 9. Rail 710 is similar to rail 610 except that central axis 711 is offset from major surface 724. Rail 710 is shown extending around about 345 degrees from major surface 724 although other embodiments can extend from about 270 degrees to about 360 degrees. Rectangular or polygonal cross sections differing in size and geometry from rail 710 are also contemplated.

Figure 10:
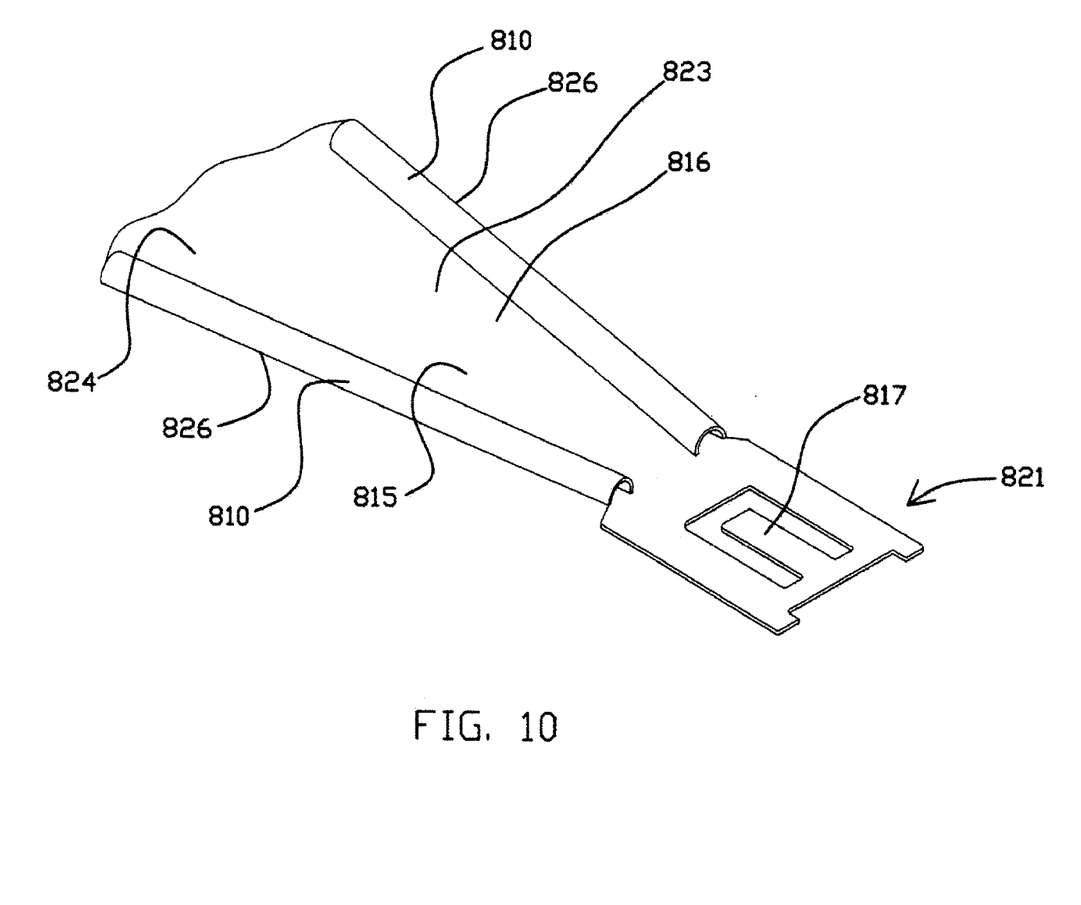
FIG. 10 is an isometric view of a flexure component for a head suspension assembly having tubular rails in accordance with another embodiment of the invention.

FIG. 10 is an illustration of a flexure 816 having tubular rails 810 in accordance with the invention. Flexure 816 is made of sheet material 815 and includes major surface 824 having side-edges 826. Sheet material 815 is shown as a single layer material though flexure 816 can be of a multilayer sheet comprised of a base spring metal layer, a conductive layer and an insulating layer between the conductive and base layers as is known in the art. Flexure 816 includes flexure beam region 823 and gimbal region 821 for supporting a magnetic head slider on slider mounting region 817. Flexure 816 can be welded or otherwise attached, via flexure beam region 823, to load beam 14 having tubular rails as previously described. Alternately, flexure 816 can be attached to a load beam without tubular rails. Rails 810 are integrally formed on the side-edges 826 from sheet material 815 and can have essentially symmetrical, circular cross sections, as shown. Flexure rails 810 with oval, elliptical, rectangular or polygonal cross sections and coplanar or offset central axes, as previously described, are also within the scope of the invention. Flexure rails 810 may also be attached to major surface 824 similar to the embodiments described with respect to FIG. 6. Flexure rails 810 are shown extending along essentially the entire length of flexure beam region 823 though rails extending partially along one or more portions of beam region 823 are contemplated as well.

Figure 11:
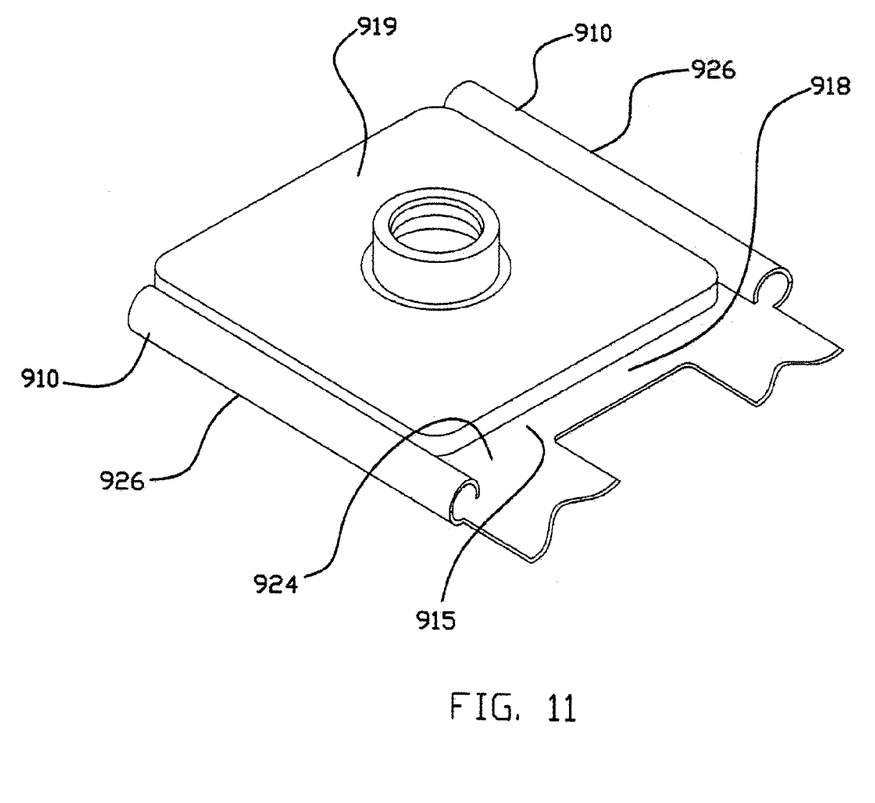
FIG. 11 is a fragmentary isometric view of a mounting region of a head suspension assembly having tubular rails in accordance with another embodiment of the invention.

FIG. 11 is an illustration of a load beam mounting region 918 according to another embodiment of the invention. Mounting region 918 is made of sheet material 915 and includes major surface 924 having side-edges 926. Sheet material 915 may be integral with or alternately, a separate component welded or otherwise attached to load beam sheet material 15. Tubular rails 910 having essentially symmetrical, circular cross sections and integrally formed on the side-edges 926 from sheet material 915, provide stiffness to mounting region 918 thus allowing for a thinner, lower mass base plate 919. Mounting region rails 910 with oval, elliptical, rectangular or polygonal cross sections and coplanar or offset central axes, as previously described, are also within the scope of the invention. Mounting region rails 910 may also be attached to major surface 924 similar to the embodiments described with respect to FIG. 6. Mounting region rails 910 can extend along essentially the entire length of mounting region 918, as shown, although rails extending partially along one or more portions of mounting region are within the scope of the invention.

Figure 12:
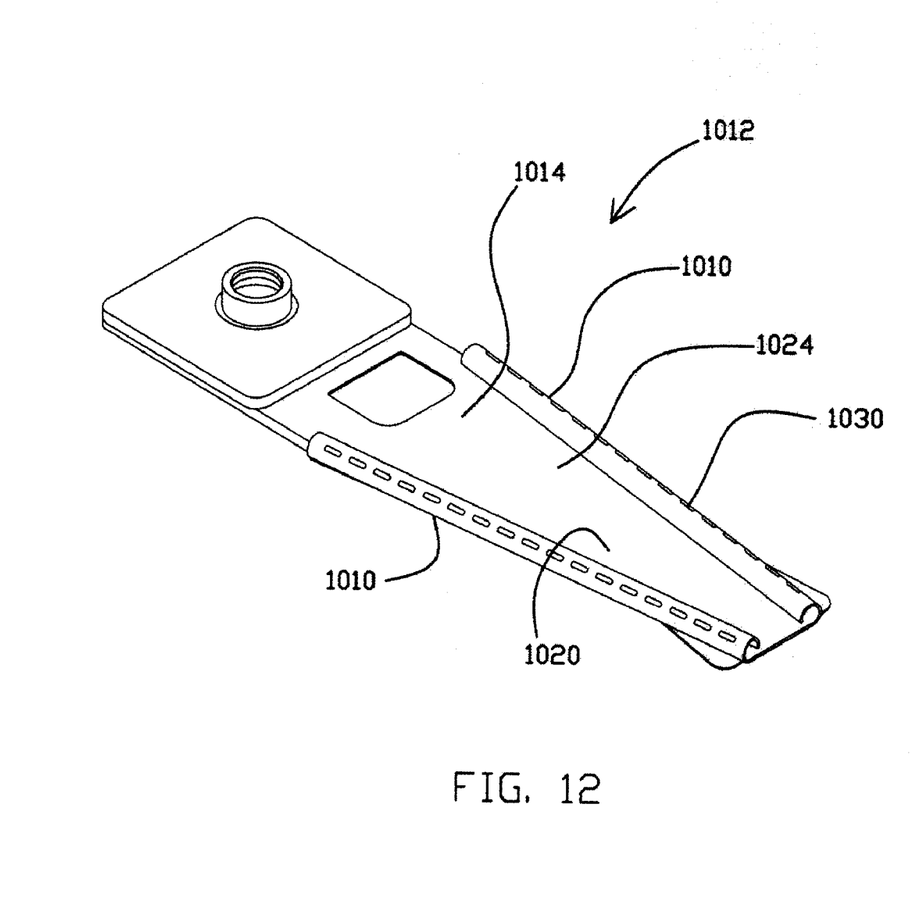
FIG. 12 is an isometric view of a head suspension assembly having tubular rails with mass reduction apertures in accordance with the present invention.

FIG. 12 shows head suspension 1012, similar to suspension 12 described with respect to FIG. 1, having tubular rails 1010 with mass reduction apertures 1030. Suspension 1012 includes a load beam 1014 having a relatively rigid beam region 1020. Rails 1010 may have essentially symmetrical, circular, oval, elliptical, rectangular or polygonal cross sections and coplanar or offset central axes as previously described. Rails 1010 may also be attached to major surface 1024 similar to the embodiments described with respect to FIG. 6. Mass reduction apertures 1030 are shown as generally rectangular apertures though any geometry, such as, for example, circular, oval, trapezoidal or triangular, that provides sufficient mass reduction while maintaining structural integrity of the rail is contemplated. Mass reduction apertures 1030 can be formed by known methods such as chemical etching, laser cutting or stamping. Though rails 1010 having mass reduction apertures 1030 are shown on beam region 1020 of load beam 1014, tubular rails having mass reduction apertures on the flexure beam 823 and load beam mounting 918 regions are also contemplated.

Figures 13, 14:
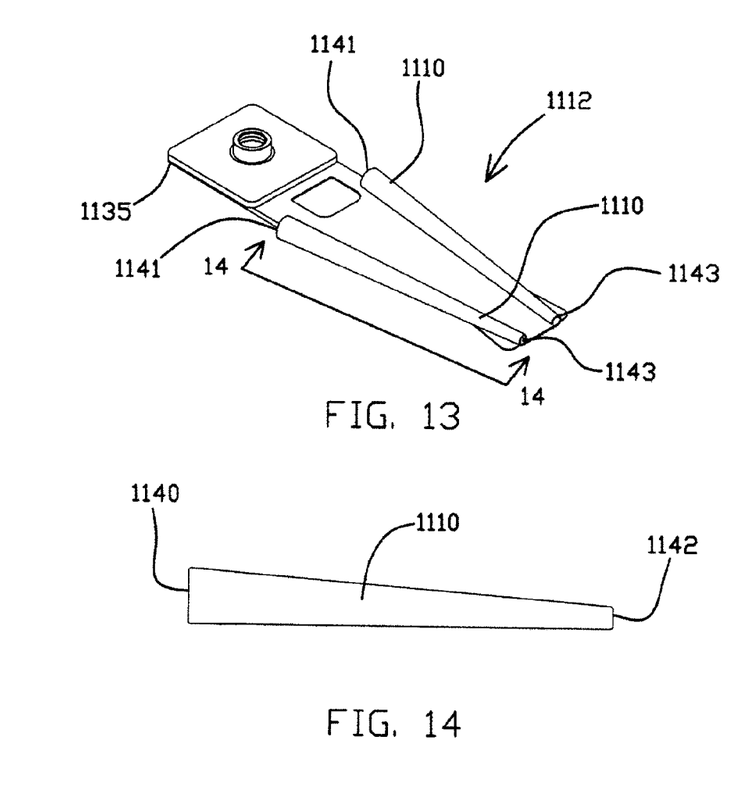
FIG. 13 is an isometric view of a head suspension assembly having tubular rails with changing cross section in accordance with the present invention.
FIG. 14 is a detailed cross sectional view, taken along line 14-14, of the tubular rail of FIG. 13.

A head suspension 1112 having tubular rails 1110 with changing cross sectional area is shown in FIG. 13. Suspension 1112 is similar to suspension 12 described with respect to FIG. 1. Rails 1110 each include proximal end 1141 and distal end 1143 and are shown having an essentially symmetrical, circular cross section though any of the tubular rail embodiments previously described can have changing cross sectional area. FIG. 14 is a cross section of rail 1110, taken along line 14-14 in FIG. 13, showing a reduction in cross sectional area with increasing distance from the proximal end 1135 of suspension 1112. As shown, cross sectional area 1140 of the proximal end 1141 of rail 1110 is larger than cross sectional area 1142 of the distal end 1143 of rail 1110. Though rail 1110 is shown decreasing in cross sectional area with increasing distance from proximal end 1135 of suspension 1112, rails with other sizes, dimensions and cross sectional area changes are within the scope of the invention. For example, the cross sectional area may increase with increasing distance from proximal end 1135 or the cross sectional area may be variable with increasing distance from proximal end 1135.

Figure 15:
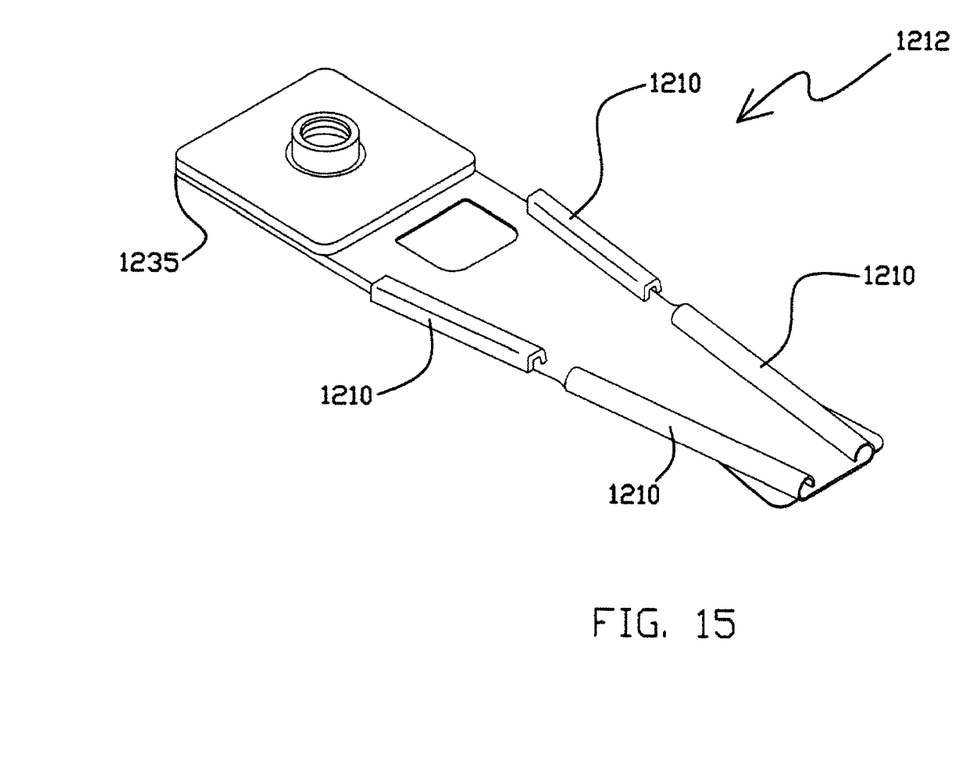
FIG. 15 is an isometric view of a head suspension assembly having tubular rails with changing cross section in accordance with another embodiment of the invention.

FIG. 15 shows a suspension 1212, similar to suspension 12 described earlier, having tubular rails 1210 with changing cross sectional shape. As shown, rails 1210 have an essentially symmetrical, rectangular cross section that changes to an essentially symmetrical, circular cross section with increasing distance from proximal end 1235. Tubular rails with other sizes, dimensions and changing cross sectional shapes such as those previously described are also within the scope of the invention. For example, rails 1210 can change from an essentially symmetrical, circular shape to an essentially symmetrical, oval or elliptical shape. Rails 1210 are shown having an essentially constant cross sectional area though rails that change in both cross sectional area and cross sectional shape are contemplated as well.

Methods of manufacturing tubular rails with respect to the embodiments described above are similar to processes used to manufacture hinges such as disclosed in, for example, U.S. Pat. No. 1,649,586 to Habart. In one method for making tubular rails according to the present invention, described with respect to FIG. 1, a multi-operation die is used to sequentially form tubular rails 10. In a first operation, major surface 24 is clamped and the side-edges 26 are formed approximately 90 degrees around a die having a shape and outer radius of curvature required for the desired rail geometry. In a second operation, major surface 24 is clamped and the side-edges 26 are formed an additional approximately 90 degrees around a die having an outer radius of curvature similar to the die in the first station. The partially formed rail extends around about 180 degrees after the second operation. In a third operation, major surface 24 is clamped and the free edges 25 are formed within a die having an inner radius of curvature and shape required to achieve the desired rail geometry such that the rail 10 extends around about 270 to 360 degrees.

Tubular rails having essentially symmetrical cross sections are readily inspected leading to improved process control and more consistent manufacturing. The consistent shape of essentially symmetrical cross section tubular rails allows for precise location of the rail shear center with respect to the center of mass of the head suspension or head suspension component resulting in improved and tailorable resonance characteristics.

The embodiments and methods of manufacture described above are examples only. Those skilled in the art will recognize that changes may be made in form and detail without departing from the spirit and scope of the invention.

What is claimed is:

1. A relatively stiff head suspension component comprising:
   a sheet material having a major surface with side-edges;
   tubular stiffening rails integrally formed on the side-edges from the sheet material, the tubular rails substantially symmetrical in cross section and extending around at least about 270 degrees from the major surface.

2. The component of claim 1 wherein the component is a load beam and the side-edges are on the beam region of the load beam.

3. The component of claim 1 wherein the component is a flexure.

4. The component of claim 1 wherein the component is a load beam and the side-edges are on the mounting region of the load beam.

5. The component of claim 1 wherein at least portions of the tubular rails have a substantially circular cross section.

6. The component of claim 1 wherein at least portions of the tubular rails have a substantially polygonal cross section.

7. The component of claim 1 wherein at least portions of the tubular rails have a substantially oval cross section.

8. The component of claim 1 wherein at least one of the cross sectional area and cross sectional shape of the tubular rails change with increasing distance from the proximal end of the suspension.

9. The component of claim 1 wherein the tubular rails include a free edge fixedly attached to at least portions the major surface.

10. The component of claim 1 wherein at least portions of the tubular rails include mass reduction apertures.

* * * * *